(No Model.)

W. S. RHODES
PISTON ROD PACKING.

No. 419,069.  Patented Jan. 7, 1890.

Attest:
O. Arthur
G. E. Ewin

Inventor:
William S. Rhodes.
By Knight Bro.
Attys.

UNITED STATES PATENT OFFICE.

WILLIAM S. RHODES, OF ST. LOUIS, MISSOURI.

PISTON-ROD PACKING.

SPECIFICATION forming part of Letters Patent No. 419,069, dated January 7, 1890.

Application filed March 19, 1889. Serial No. 303,846. (No model.)

*To all whom it may concern:*

Be it known that I, WILLIAM S. RHODES, of the city of St. Louis, in the State of Missouri, have invented a certain new and useful Improvement in Piston-Rod Packing, of which the following is a full, clear, and exact description, reference being had to the accompanying drawings, forming part of this specification.

This packing consists of sectional metal rings and rubber, as hereinafter set forth.

Figure 1:
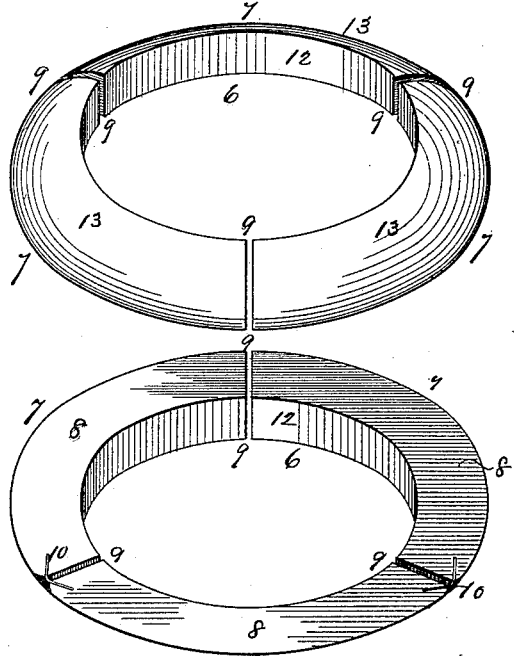
Figure 2:
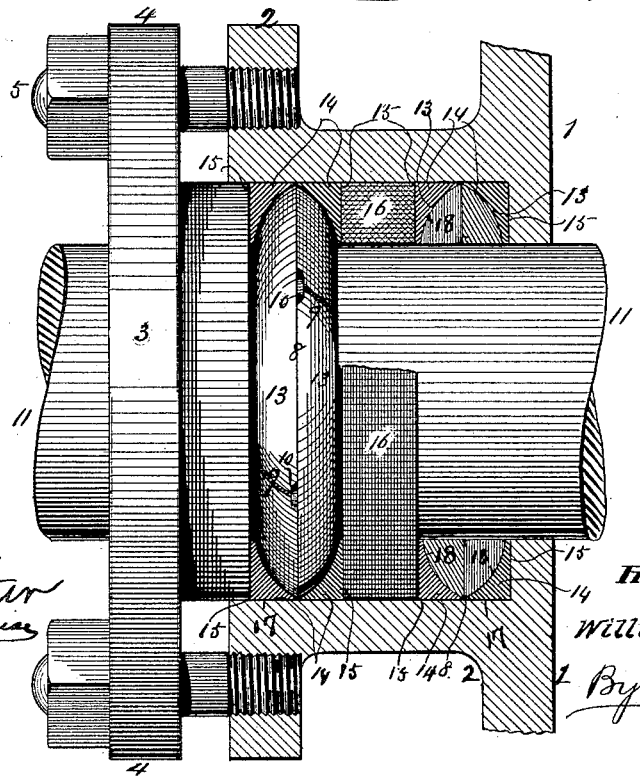

Figure 1 is a perspective view of two of the sectional metal rings. Fig. 2 is partly a side view and partly an axial section of the stuffing-box.

1 is part of the cylinder-head.

2 is the stuffing-box with gland 3 of usual or any suitable form.

4 and 5 are the usual flange and stud bolts, respectively.

Each metal ring 6 consists of two or more sections 7, three sections being shown. The rings 6 are made with flat sides 8, and are used in pairs with the flat sides laid together, as seen in Fig. 2, the flat sides forming with each other a practically steam-tight joint. The two rings of the pair are so disposed that the joints or openings 9 between two sections of one ring are opposite to the middle of the sections in the other ring, so as to break joints. The ends of the sections are preferably connected by thin strips 10, of soft metal, which will serve to hold the sections in place during insertion in the stuffing-box, but which will not resist the contraction of the ring upon the piston-rod 11, owing to the weakness of the metal strips. The concave sides 12 of the rings are made to accurately fit the circumference of the piston-rod, and in transverse section are at right angles with the flat side 8. The third side 13 of the rings is preferably convexly curved, as seen, although, if preferred, it may be beveled. The shape, however, must be such that the soft-rubber packing-rings 14 will tend to press the sections 7 of the rings inward upon the piston-rod under the pressure of the gland and steam-pressure from the interior of the cylinder. Each pair of the rings 6 6 has a soft-rubber ring 14 upon each side, one side 15 of each rubber ring fitting against either the bottom of the stuffing-box, the gland, or a hard-rubber ring 16, as the case may be. Another side 17 of the rubber ring fits the circumference of the stuffing-box, while the third side 18 fits the side 13 of the ring 6. The hard-rubber ring 16 is cylindrical in form and is used when more than one pair of the rings 6, with their pressure-rings 14, are used. In such case the hard-rubber ring is inserted, as shown in Fig. 2, to keep the metal rings 6 asunder. Two pairs of the metal rings are shown in Fig. 2. There may be more or less of these pairs, which are separated by the required number of hard-rubber rings 16 between the pairs. The ring 16 is described as of hard rubber, which I believe to be the best material for this purpose and which I have used; but I do not confine myself to this material. The form of the rings 6 is such that they force the soft-rubber rings 14 from the rod, and the adhesion of the rings 14 and 16 causes the rings 14 to carry the rings 16 outward, so that the metal rings are the only parts of the packing which come in contact with the piston-rod. Consequently it has great durability. Where the rod is worn out of round or it is out of line, the elasticity of the rubber allows the packing to accommodate itself to the inequality or the transverse movement, as the case may be, and leak of steam and springing of the rod are avoided. The pressure of steam against the inner end of the packing, when live steam is in that end of the cylinder, serves to force the packing-rings 6 against the piston-rod, and also the rubber rings against the sides of the stuffing-box, thus preventing escape of steam. When the steam is exhausting from this end of the cylinder, the packing is almost relieved from steam-pressure and the friction of the piston-rod upon the rings 6 is proportionally reduced. This causes the rod to run easily through the packing. The pressure of the steam upon the packing is also lessened when it is cut off and increased as the piston cushions against the exhaust-steam at the end of the stroke toward that end of the cylinder, so that in every case the friction of the packing against the piston-rod decreases and increases with the pressure of the steam in that end of the cylinder.

The packing can be applied in any ordinary stuffing-box, no change being needed either in the body of the stuffing-box or in the gland.

I claim as my invention—

1. The sectional rings 6, adapted to fit together and break joints and provided with connecting-strips 10, substantially as and for the purpose set forth.

2. The combination, in a piston-rod packing, of the metal rings composed of sectional parts 6, fitting together and adapted to break joint, having inclined outer sides 13, the soft rings 14, bearing against the sides 13 and the sides of the stuffing-box, and the cylindrical ring 16, all substantially as set forth.

WILLIAM S. RHODES.

Witnesses:
 SAML. KNIGHT,
 BENJN. A. KNIGHT.